United States Patent
Kim et al.

(10) Patent No.: US 7,388,849 B2
(45) Date of Patent: Jun. 17, 2008

(54) LOW-POWER TRANSMITTING APPARATUS AND TRANSMISSION METHOD IN WIRELESS PERSONAL AREA NETWORK

(75) Inventors: Yong-suk Kim, Suwon-si (KR); Yang-ick Joo, Suwon-si (KR); Jae-won Yoo, Suwon-si (KR); Kyun-hyon Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 502 days.

(21) Appl. No.: 11/191,075

(22) Filed: Jul. 28, 2005

(65) Prior Publication Data

US 2006/0023670 A1 Feb. 2, 2006

(30) Foreign Application Priority Data

Jul. 28, 2004 (KR) ...................... 10-2004-0059295

(51) Int. Cl.
*H04Q 7/00* (2006.01)

(52) U.S. Cl. ...................... 370/329; 370/338; 370/347; 370/442; 370/458; 370/468; 370/522; 455/127.1; 455/522

(58) Field of Classification Search ................ 370/329, 370/338, 347, 442, 458, 468, 522; 455/127.1, 455/522
See application file for complete search history.

*Primary Examiner*—Joseph Feild
*Assistant Examiner*—Inder Pal Mehra
(74) *Attorney, Agent, or Firm*—Sughrue Mion, PLLC

(57) ABSTRACT

A low-power transmitting apparatus and transmission method in a wireless personal area network (WPAN). A length of a fragment, a data rate, and a transmission power is selected to transmit a frame with minimum energy consumption in a contention period and a contention-free period. Thus, a quality of service (QoS) requirement for the transmission can be satisfied and the data frame can be transmitted with less energy consumption. Even when the channel status changes, a new transmission criterion suitable for the changed channel status is selected to minimize the consumption of the unnecessary energy. Furthermore, the life span of the network according to the energy consumption under a restricted environment can be lengthened.

22 Claims, 3 Drawing Sheets

LOW-POWER TRANSMITTING APPARATUS AND TRANSMISSION METHOD IN WIRELESS PERSONAL AREA NETWORK

CROSS-REFERENCE TO RELATED APPLICATIONS

This application claims priority from Korean Patent Application No. 2004-59295 filed on Jul. 28, 2004, in the Korean Intellectual Property Office, the entire disclosure of which is incorporated herein by reference.

BACKGROUND OF THE INVENTION

1. Field of the Invention

Apparatus and methods consistent with the present invention relate generally to low-power transmission in a wireless personal area network (WPAN), and more specifically to a low-power transmission in a WPAN for enhancing efficiency of a transmission energy in a contention period and a contention-free period and supporting quality of service (QoS).

2. Description of the Related Art

A WPAN implements an existing personal area network (PAN) by wireless connection. In contrast to a local area network (LAN) or a wide area network (WAN) being widely operated, the PAN is a network owned by an individual. Devices owned by the individual are interconnected to construct a network in order to provide convenience for the owner.

The Institute of Electrical and Electronics Engineers, Inc. (IEEE) 802.15 Working Group developed the WPAN for short distance wireless networks to standardize and implement the PAN. The IEEE 802.15 standard has four Task Groups. More particularly, IEEE 802.15.1 standardizes the well-known Bluetooth technology, whereas IEEE 802.15.3 standardizes the high rate WPAN. Additionally, IEEE 802.15.4 standardizes low rate WPAN.

The WPAN, which is a short distance wireless network, supports various portable computing devices including electronic devices such as a personal computer (PC), a personal digital assistant (PDA), a wireless printer, a storage medium, a mobile phone, a set-top box, and the like.

Figure 1:
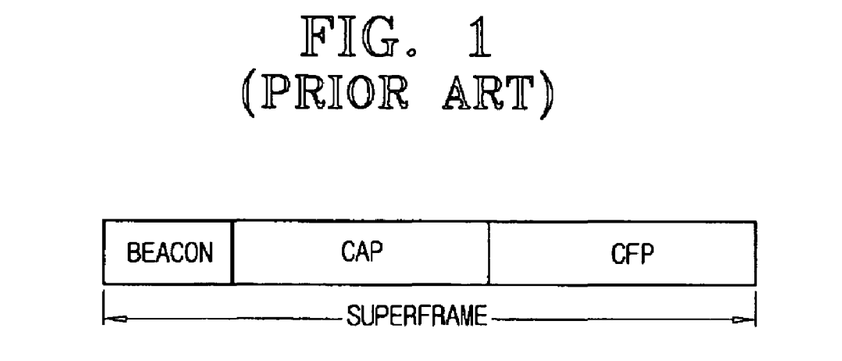
FIG. 1 is a diagram of a structure of a superframe used for wireless communications in a WPAN.

FIG. 1 depicts a structure of a superframe used for wireless communications under the WPAN environment.

In FIG. 1, the superframe consists of a beacon used as a sync signal, a contention access period (CAP) called a contention period, and a channel time allocation period (CTAP) being a contention-free period. The contention period conforms to the carrier sense multiple access with collision avoidance (CSMA/CA) protocol. In case of the IEEE 802.15.3, the time division multiple access (TDMA) technology is adopted in the contention-free period.

Under the WPAN environment, the devices generally have a limited energy source and thus its energy consumption is restricted. It can be said that a life span of the network depends on the energy consumption of the devices. Thus, a technology is demanded to enhance the efficiency of the transmission energy in the contention period and the contention-free period and to support quality of service (QoS).

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

An aspect of the present invention provides a low-power transmitting apparatus and transmission method for minimizing a transmission energy consumption and guaranteeing quality of service (QoS) in a wireless personal area network (WPAN).

To achieve the above aspects and/or features of the present invention, a low-power transmission method in a wireless network, includes assigning a time slot in a channel time allocation period (CTAP) according to a time division multiple access (TDMA) scheme; selecting a combination $<L^*, R', P_t'>$ of a length L of a fragment, a data rate R, and a transmission power P1 to minimize an energy $E(L^*, R, P_t)$ consumed to transmit at least one MAC service data unit (MSDU) using the assigned time slot; and transmitting a frame to another apparatus over the network based on the selected $<L^*, R', P_t'>$.

$<L^*, R', P_t'>$ can be calculated from the equation:

$$<L^*, R', P_t'> = \arg \min_{<L,R,Pt>} E(L^*, R, P_t)$$

where L is the length of the fragment, R is the data rate, $P_t$ is the transmission power, and E( ) is an energy consumption.

$E(L^*, R, \cdot P_t)$ can be obtained by adding up $E_{MSDU,k(\ )}$ that is an energy consumed to transmit each MSDU in the assigned time slot.

$E_{MSDU,k(\ )}$ can be calculated from the equation:

$$E_{MSDU,k}(L, R, P_t) = \left\{\left[\frac{L_{MSDU}}{L}\right]E_{frame}(L, R, P_t) + E_{frame}(L_{remain}, R, P_t)\right\}\sum_{i=0}^{q} FER^i + \left[\frac{L_{MSDU}}{L}\right]$$

$$\{(E_{SIFS} + E_{ACK})(1 - FER) + E_{SIFS} \cdot FER\} \cdot \sum_{i=0}^{q} FER^i$$

where L is the length of the fragment, R is the data rate, $P_t$ is the transmission power, $L_{MSDU}$ is a size of the MSDU, $L_{remain}$ is a size of the rest fragment after dividing $L_{MSDU}$ by L, $E_{frame(\ )}$ is an energy consumed to transmit one frame, $E_{SIFS}$ is an energy consumed to wait for an ACK frame of an ACK mode when the frame transmission is successful, $E_{ACK}$ is an energy consumed to receive the ACK frame, FER is a frame error rate, and q is an upper limit value of the transmission retries.

The low-power transmission method may further include determining whether a frame to be transmitted is a start of a new MSDU when a channel environment changes during the frame transmission; selecting a new combination $<L^*, R', P_t'>$ with respect to a remaining time of the assigned time slot when the start of the new MSDU is determined; and fixing L* with respect to the remaining time of the assigned time slot and selecting the combination $<L^*, R', P_t'>$ to transmit the frame with a minimum energy consumption when the start of the new MSDU is not determined.

In accordance with another aspect of the present invention, a low-power transmission method in a wireless network, includes accessing a channel to transmit a media access control (MAC) service data unit (MSDU) according to a carrier sense multiple access with collision avoidance (CSMA/CA) scheme in a contention access period (CAP); selecting a combination <L*,R',P$_t$'> of a length L of a fragment, a data rate R, and a transmission power P$_t$ to minimize an energy E(L*,R,P$_t$) consumed to transmit at least one MAC service data unit (MSDU) using the assigned time slot; and transmitting a frame to another apparatus over the network based on the selected <L*,R',P$_t$'>.

<L*,R',P$_t$'> can be calculated from the equation:

$$< L^*, R', P'_t > = \arg \min_{<L,R,Pt>} E(L^*, R, P_t)$$

where L is the length of the fragment, R is the data rate, Pt is the transmission power, and E( ) is an energy consumption.

E(L*,R,P$_t$) can be obtained by multiplying E$_{frame( )}$, which is an energy consumed to transmit one frame, by a quotient resulting from the division of the size of the MSDU by the length of the fragment, and by a remainder, respectively.

E$_{frame( )}$ can be calculated from the equation:

$$E_{frame}(L, R, P_t) = E[N_c](E_{BD}+E_{wait})+E_{data}(L, R, P_t)+E_{ACK}$$

where E[N$_c$] is a number of re-transmissions in consideration of a transmission error due to collision with the another apparatus and channel environment, E$_{BD}$ is an energy including an energy consumed to search a channel during a backoff delay and an energy consumed at the failure of the frame transmission, E$_{wait}$ is an energy consumed to await before retransmitting, E$_{data( )}$ is a transmission energy consumed at the successful frame transmission, and E$_{ACK}$ is an energy consumed to receive the ACK.

The low-power transmission method may further include fixing L* and selecting the combination <L*,R',P$_t$'> to transmit the frame with a minimum energy consumption with respect to a time required to transmit the rest of the frame when the channel environment changes during the frame transmission.

The time required to transmit the rest of the frame can be calculated from the equation:

$$E[D]=E[N_c](E[B_D]+T_c+T_0)+(E[BD]+T_S)$$

where E[BD] is the backoff delay in consideration of a delay time which is caused when the another transmission system occupies a channel and a size of a contention window (CW), T$_c$ is a time taken at the failure of the frame transmission, T$_0$ is a time required before searching a new channel, and T$_s$ is a transmission time at a successful frame transmission.

In accordance with yet another aspect of the present invention, a low-power transmitting apparatus in a wireless network includes a communication controller for communicating with a media access control (MAC) layer and transmitting a frame to another apparatus based on a length L of a fragment including at least one MAC service data unit (MSDU), a data rate R, and a transmission power P$_t$ over a network that conforms to a carrier sense multiple access with collision avoidance (CSMA/CA) scheme in a contention period and conforms to a time division multiple access (TDMA) scheme in a contention-free period; a power regulator for selecting a combination among possible combinations of L, R, and P$_t$ to minimize an transmission energy consumption E(L*,R,P$_t$) of the communication controller and providing the selected combination to the communication controller; and a transmitter for transmitting the frame received from the communication controller to another apparatus.

The power regulator may calculate a combination <L*, R',P$_t$'> which minimizes the transmission energy consumption among the combinations of L, R, and P$_t$, from the equation:

$$< L^*, R', P'_t > = \arg \min_{<L,R,Pt>} E(L^*, R, P_t),$$

where L is the length of the fragment, R is the data rate, P$_t$ is the transmission power, and E( ) is an energy consumption.

When the power regulator transmits the MSDU in a contention period, E(L*,R,P$_t$) can be obtained by multiplying E$_{frame( )}$, which is an energy consumed to transmit one frame, by a quotient resulting from the division of the size of the MSDU by the length of the fragment, and by a remainder, respectively.

E$_{frame( )}$ can be calculated from the equation:

$$E_{frame}(L, R, P_t) = E[N_c](E_{BD}+E_{wait})+E_{data}(L, R, P_t)+E_{ACK}$$

where E[N$_c$] is a number of re-transmissions in consideration of transmission error due to collision with the another apparatus and channel environment, E$_{BD}$ is an energy including an energy consumed to search a channel during a backoff delay and an energy consumed at the failure of the frame transmission, E$_{wait}$ is an energy consumed to await before retransmitting, E$_{data( )}$ is an transmission energy consumed at the successful frame transmission, and E$_{ACK}$ is an energy consumed to receive the ACK.

The power regulator may fix L* and select the combination <L*,R',P$_t$'> to transmit the frame with a minimum energy consumption with respect to a time required to transmit the rest frame when the channel environment changes during the frame transmission.

The time required to transmit the rest frame can be calculated from the equation:

$$E[D]=E[N_c](E[BD]+T_c+T_0)+(E[BD]+T_S)$$

where E[BD] is the backoff delay in consideration of a delay time which is caused when the another transmission system occupies a channel and a size of a contention window (CW), T$_c$ is a time taken at the failure of the frame transmission, T$_0$ is a time required before searching a new channel, and T$_S$ is a transmission time at a successful frame transmission.

The communication controller transmits the frame using an assigned time slot when transmitting the MSDU in the contention-free period, and the power regulator defines E(L*,R,P$_t$) by adding up E$_{MSDU,k( )}$ that is an energy consumed to transmit each MSDU in the assigned time slot.

E$_{MSDU,k( )}$ can be calculated from the equation:

$$E_{MSDU,k}(L, R, P_t) = \left\{\left[\frac{L_{MSDU}}{L}\right]E_{frame}(L, R, P_t) + E_{frame}(L_{remain}, R, P_t)\right\}\sum_{i=0}^{q} FER^i + \left[\frac{L_{MSDU}}{L}\right]$$

-continued $$\{(E_{SIFS} + E_{ACK})(1 - FER) + E_{SIFS} \cdot FER\} \cdot \sum_{i=0}^{q} FER^i$$

where L is the length of the fragment, R is the data rate, $P_t$ is the transmission power, $L_{MSDU}$ is a size of the MSDU, $L_{remain}$ is a size of the rest fragment after dividing $L_{MSDU}$ by L, $E_{frame(\ )}$ is an energy consumed to transmit one frame, $E_{SIFS}$ is an energy consumed to wait for an ACK frame of an ACK mode when the frame transmission is successful, $E_{ACK}$ is an energy consumed to receive the ACK frame, FER is a frame error rate, and q is an upper limit value of the transmission retries.

The power regulator may determine whether a frame to be transmitted is a start of a new MSDU when a channel environment changes during the frame transmission, select a new combination <L*,R',$P_t$'> with respect to a remaining time of the assigned time slot when the start of the new MSDU is determined, and fix L* with respect to the remaining time of the assigned time slot and select the combination <L*,R',$P_t$'> to transmit the frame with a minimum energy consumption when the start of the new MSDU is not determined.

The network may be a wireless personal area network (WPAN).

According to yet another aspect of the present invention, a transmission system can include a transmitting apparatus similar to the transmitting apparatus described above, and can effectuate transceiving data with a minimum energy consumption over a wireless personal area network (WPAN).

BRIEF DESCRIPTION OF THE FIGURES

These and/or other aspects of the invention will become apparent and more readily appreciated from the following description of exemplary embodiments, taken in conjunction with the accompanying figures of which.

DETAILED DESCRIPTION OF EXEMPLARY EMBODIMENTS OF THE PRESENT INVENTION

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
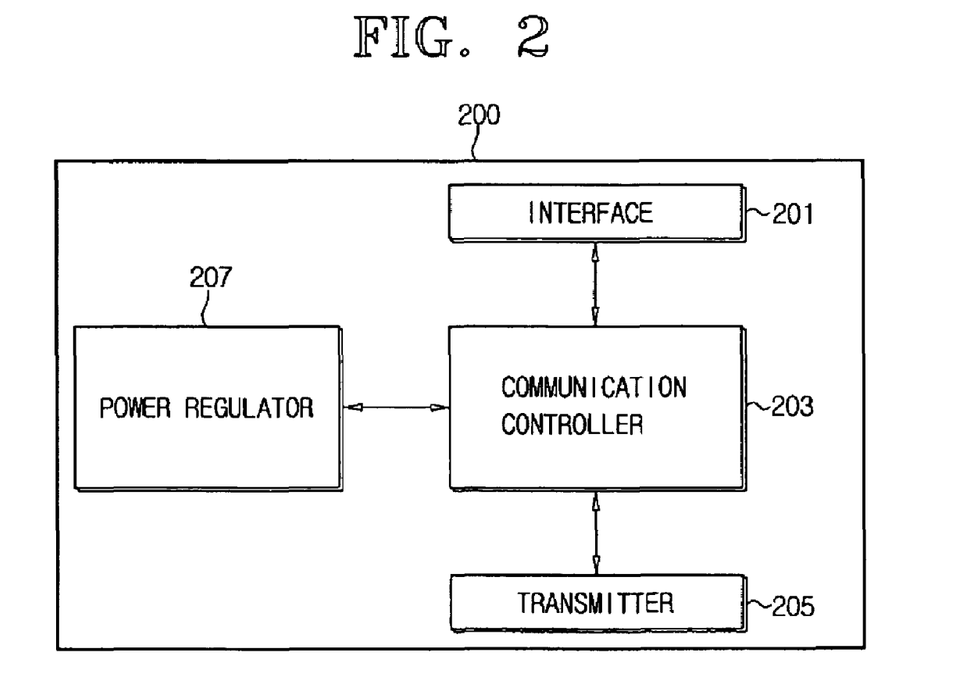
FIG. 2 is a block diagram of a low-power transmitting apparatus in a WPAN according to an exemplary embodiment of the present invention.

FIG. 2 is a block diagram of a low-power transmitting apparatus in a WPAN according to an exemplary embodiment of the present invention.

The transmitting apparatus 200 can be applied to a communication scheme of a contention-based MAC protocol and a communication scheme of time division multiple access (TDMA)-based contention-free access protocol.

Advantageously, the transmitting apparatus 200 is adopted under environments according to a contention-based communication protocol of the CSMA/CA and a contention-free communication protocol using the TDMA in the WPAN that conforms to the IEEE 802.15.3 standard. Hereinafter, descriptions are made on a high rate WPAN of the IEEE 802.15.3 standard.

Referring to FIG. 2, the transmitting apparatus 200 includes an interface 201, a communication controller 203, a transmitter 205, and a power regulator 207.

The interface 201 is connected to an interface (not shown) of a transmission system (not shown) that includes the transmitting apparatus 200. The interface 201 receives data to be delivered to another transmission system (not shown), from a central processing unit (not shown) of the transmission system (not shown) by a MSDU.

The communication controller 203 controls communications with the MAC layer in the WPAN environment of the transmitting apparatus 200. The communication controller 203 receives the data by the MSDU from the central processing unit (not shown) through the interface 201, and provides the received data by frame to the transmitter 205 in order to transfer the data to another transmission system (not shown) over a network (not shown).

The power regulator 207 calculates and determines a condition for minimum energy consumption according to a channel status so that the communication controller 203 can transmit the frame with a minimum energy. The communication controller 203 provides the MSDU to the transmitter 205 by the frame on the condition determined by the power regulator 207.

The transmitter 205 is responsible for a physical layer so as to transmit the frame received over a radio channel to another transmission system (not shown).

The power regulator 207 calculates and determines the condition to consume the minimum energy for the frame transmission in the CSMA/CA contention period and the TDMA contention-free period.

The following is an explanation of the condition determined for the minimum energy consumption at the power regulator 207.

The power regulator 207 selects a criterion for the minimum energy consumption required for the frame transmission by use of a length of a fragment (L), a data rate (R), and a transmission power ($P_t$).

To minimize the energy consumption for the frame transmission in a contention access period (CAP) and a channel time allocation period (CTAP) being the contention-free period of a superframe of the WPAN, L, R, and Pt can be obtained based on a minimum energy criterion. The minimum energy criterion is defined from Equation 1:

$$< L^*, R', P_t' > = \arg \min_{<L,R,Pt>} E(L^*, R, P_t) \qquad \text{[Equation 1]}$$

In Equation 1, $E(L^*,R,P_t)$ is an energy consumed to transmit the frame of the whole MSDU using L, R, and $P_t$, and <L*,R',$P_t$'> is a combination of L, R, and $P_t$ which is selected for the minimum energy consumption.

The power regulator 207 additionally considers a channel status and parameters such as QoS requirement to select L, R, and $P_t$ used for the transmission.

In the contention-free period, a certain amount of frames should be transmitted within an allocated guaranteed time slot (GTS). In other words, a proper degree of throughput should be satisfied. Re-transmission due to the frame transmission failure with the fixed size of the CTAP is critically disadvantageous in view of the throughput and the energy consumption. Accordingly, L, R, and $P_t$ need to be selected such that a frame error probability falls down below a specific reference value under the channel status, that is, under the presence of a noise power $P_n$ of the channel and a path loss.

In this regard, a total energy consumption $E(L^*,R,P_t)$ within the CTAP, that is, $E_{CTA}$ is obtained in accordance with Equation 2.

$$E_{CTA} = \sum_{k=1}^{K} E_{MSDU,k}(L, R, P_t) \qquad \text{[Equation 2]}$$

In Equation 2, K is the number of MSDUs to be transmitted, and $E_{MSDU,k}(L,R,P_t)$ is the energy consumed to transmit one MSDU.

$E_{MSDU,k}(L,R,P_t)$, which is the energy consumption to transmit one MSDU, can be obtained in accordance with Equation 3.

$$E_{MSDU,k}(L, R, P_t) = \qquad \text{[Equation 3]}$$
$$\left\{ \left[\frac{L_{MSDU}}{L}\right] E_{frame}(L, R, P_t) + E_{frame}(L_{remain}, R, P_t) \right\}$$
$$\sum_{i=0}^{q} FER^i + \left[\frac{L_{MSDU}}{L}\right]$$
$$\{(E_{SIFS} + E_{ACK})(1 - FER) + E_{RIFS} \cdot FER\} \cdot \sum_{i=0}^{q} FER^i$$

In Equation 3, $L_{MSDU}$ is the size of the MSDU, and $L_{remain}$ is a size of the remaining fragment after dividing $L_{MSDU}$ by L. $E_{frame}$ is the energy consumed to transmit one frame, $E_{SIFS}$ is an energy consumed to wait for an ACK frame in an ACK mode when the frame transmission is successful, and EACK is an energy consumed to receive the ACK frame. FER is a frame error rate, and q is an upper limit value of the transmission retries.

As for the contention-free period, when the power regulator 207 is assigned to a time slot and selects $<L^*,R,P_t'>$, $<L^*,R',P_t'>$ is not reselected unless the channel status changes.

As for the CAP, the minimum energy criterion is required in consideration of the QoS requirement for the whole MSDU and the effect of the frame size on the energy consumption relating to the data transmission. In addition, consideration is given to an energy consumed during a backoff delay for a channel search to transmit data, an energy consumed at failure of the frame transmission, and an energy consumed while waiting prior to the retransmission.

An estimated energy $E_{MSDU(\ )}$ consumed for the transmission of the whole frame, which needs consideration to guarantee the QoS of the MSDU, can be obtained in accordance with Equation 4. $E_{MSDU(\ )}$ in the CAP becomes $E(L^*,R,P_t)$ of the minimum energy criterion in Equation 1.

$$E_{MSDU}(L, R, P_t) = \left[\frac{L_{MSDU}}{L}\right] \cdot E_{frame}(L, R, P_t) + \qquad \text{[Equation 4]}$$
$$E_{frame}(L_{rem}, R, P_t)$$

In Equation 4, $L_{MSDU}$ is the size of the MSDU, and $L_{rem}$ is a length of the fragment obtained after dividing $L_{MSDU}$ by L. $E_{frame}$ is an energy consumed to transmit one frame.

The energy $E_{frame(\ )}$ consumed to transmit one frame can be defined as in Equation 5.

$$E_{frame}(L, R, P_t) = E[N_c](E_{BD}+E_{wait})+E_{data}(L, R, P_t)+ E_{ACK} \qquad \text{[Equation 5]}$$

In Equation 5, $E_{BD}$ is an energy including an energy consumed to search a channel during the backoff delay and an energy consumed at the failure of the frame transmission. $E_{wait}$ is an energy consumed while waiting prior to the retransmission, and $E_{data(\ )}$ is a transmission energy consumed at the successful frame transmission. $E[N_c]$ is the number of the retransmissions in consideration of collisions with another transmission system (not shown) and transmission error due to the channel environment. $E_{ACK}$ is an energy consumed to receive the ACK.

As for the CAP, as the communication controller 203 is not yet assigned to the time slot required to transmit the MSDU, the power regulator 207 selects a new $<L^*,R',P_t'>$ by the MSDU.

When the channel environment changes while the communication controller 203 transmits the frame using the selected $<L^*,R',P_t'>$, the power regulator 207 selects a new combination of $<L^*,R',P_t'>$ with respect to a time required to transmit the remaining frame.

In this case, in the CAP, the power regulator 207 fixes L to $L^*$ and selects only the new $<R',P_t'>$ with respect to the time required to transmit the remaining MSDU.

Equation 6 defines the minimum energy criterion for selecting the new $<R',P_t'>$ alone.

$$<R', P_t'> = \arg \min_{<L,R,Pt>} E(L^*, R, P_t) \qquad \text{[Equation 6]}$$

In the CAP, the time taken to successfully transmit one frame is obtained in accordance with Equation 7.

$$E[D]=E[N_c](E[BD]+T_c+T_0)+(E[BD]+T_S) \qquad \text{[Equation 7]}$$

In Equation 7, E[BD] is the backoff delay in consideration of a delay time which is caused when another transmission system (not shown) occupies the channel, and a size of a contention window (CW). $T_c$ is a time taken at the failure of the frame transmission, $T_0$ is a time required before searching a new channel, and $T_S$ is a transmission time at the successful frame transmission.

As for the CTAP, the power regulator 207 determines whether the frame to be transmitted after the channel status changes is by the new MSDU among the remaining MSDUs. When the new MSDU is not transmitted, the power regulator 207 fixes L to $L^*$ and selects only the new $<R',P_t'>$ with respect to the remaining time of the assigned time slot in accordance with Equation 6.

If the point of the channel status change is the start point of the new MSDU in the CTAP, the power regulator 207 acquires a new $<L^*,R',P_t'>$ with respect to the remaining time of the assigned time slot in accordance with Equation 2 and Equation 3.

Figure 3:
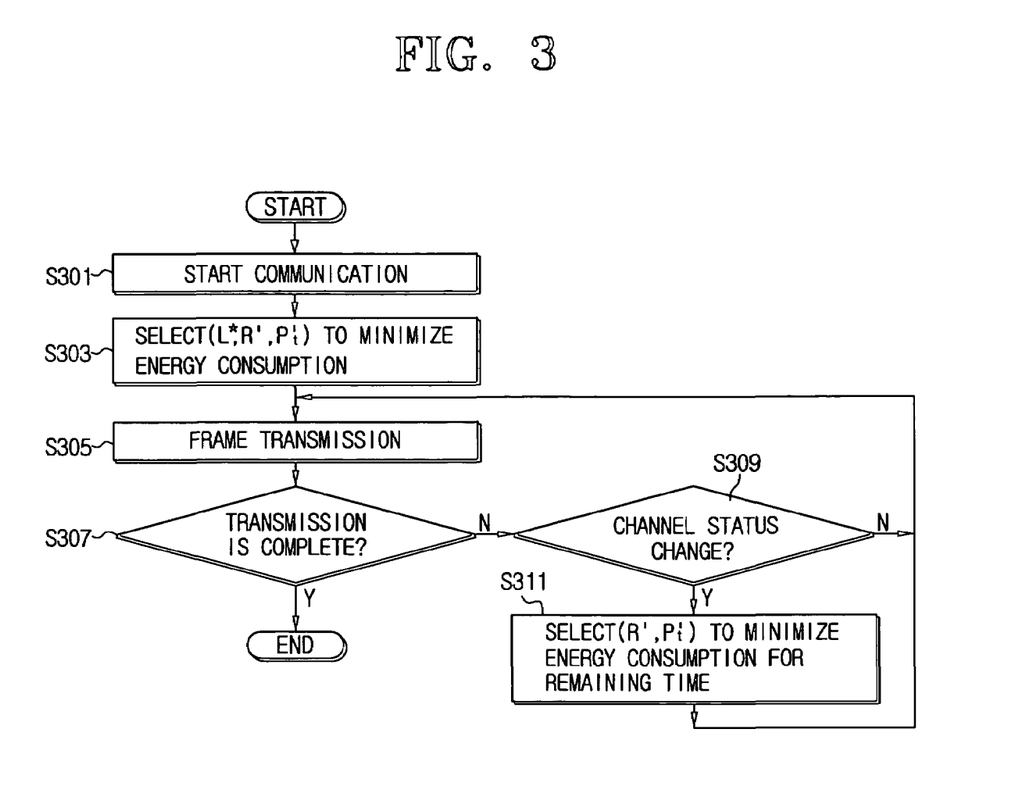
FIG. 3 is a flowchart explaining an operation of the low-power transmitting apparatus in a CAP according to an exemplary embodiment of the present invention.

FIG. 3 is a flowchart explaining an operation of the low-power transmitting apparatus 200 in the CAP in the WPAN according to an exemplary embodiment of the present invention.

The communication controller 203 starts to transmit the MSDU by accessing the channel in the CAP following a beacon period (S301). The power regulator 207 selects <L*,R',P$_t$'> to minimize the energy consumption based on the minimum energy criterion (S303). The minimum energy criterion is Equation 1 to which Equation 5 is applied. As for the contention period, the power regulator 207 selects the new <L*,R',P$_t$'> by the MSDU.

The communication controller 203 transmits a frame, which is a fragmented MSDU, based on <L*,R',P$_t$'> selected at the power regulator 207 (S305).

Before completing the MSDU transmission (S307), if the channel status changes (S309), the power regulator 207 selects the combination of <R',P$_t$'> fit for the changed channel status with respect to the remaining time in accordance with Equation 6. As the fragmentation of the MSDU is already done, the length L of the fragment is fixed and not considered further. The energy calculation equation is Equation 4 not Equation 5 for the whole MSDU. The power regulator 207 selects the combination of the new <R',P$_t$'> in accordance with Equation 6 to which Equation 4 is applied (S311).

Figure 4:
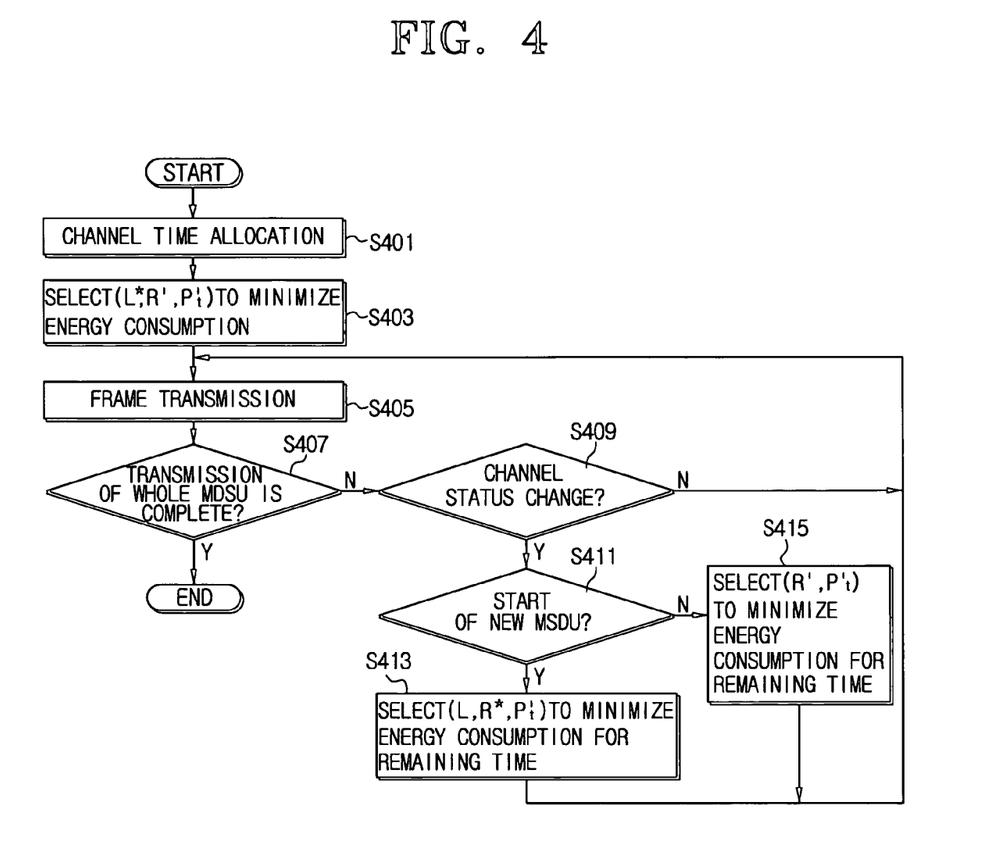
FIG. 4 is a flowchart explaining an operation of the low-power transmitting apparatus in a CTAP according to an exemplary embodiment of the present invention.

FIG. 4 is a flowchart explaining an operation of the low-power transmitting apparatus 200 in the CTAP in the WPAN according to an exemplary embodiment of the present invention.

When a piconet coordinator assigns a channel to the communication controller 203 to enable communications (S401), the power regulator 207 selects <L*,R',P$_t$'> to minimize the energy consumption for the transmission in accordance with Equation 3 (S403). The communication controller 203 transmits the frame according to <L*,R',P$_t$'> selected by the power regulator 207 (S405).

When the communication controller 203 does not complete the transmission of the whole MSDU within the assigned time slot (S407), if the channel status changes (S409), the power regulator 207 selects a new criterion to minimize the energy consumption for the transmission.

The power regulator 207 determines whether the changed channel status is the start of the new MSDU (S411). If the new MSDU needs to be transmitted, the combination of the new <L*,R',P$_t$'> is selected with respect to the remaining time of the assigned time slot (S413).

If the channel status change is not the start of the new MSDU according to the determination at operation S411, the power regulator 207 selects the combination of <R',P$_t$'> suitable for the changed channel status with respect to the remaining time of the assigned time slot in accordance with Equation 6 (S415).

The communication controller 203 transmits the frame at operation S405 according to the new <L*,R',P$_t$'> combination that is selected by the power regulator 207.

Therefore, the low-power transmitting apparatus 200 operates in the WPAN.

As set forth above, the QoS requirement can be satisfied and the data can be transmitted with less energy consumption. Even when the channel status changes, the new transmission criterion suitable for the changed channel status is selected to thus minimize the energy consumption. Furthermore, the life span of the network according to the energy consumption can be lengthened in the restricted conditions.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A low-power transmission method in a wireless network, comprising:
    assigning a time slot in a channel time allocation period (CTAP) according to a time division multiple access (TDMA) scheme;
    selecting a combination <L*,R',P$_t$'> of a length L of a fragment, a data rate R, and a transmission power P$_t$ to minimize an energy E(L*,R,P$_t$) consumed to transmit at least one media access control (MAC) service data unit (MSDU) using the assigned time slot; and
    transmitting a frame to another apparatus over the network based on the selected <L*,R',P$_t$'>.

2. The low-power transmission method of claim 1, wherein <L*,R',P$_t$'> is calculated from the equation:

$$<L^*, R', P_t'> = \arg \min_{<L,R,Pt>} E(L^*, R, P_t),$$

where L is the length of the fragment, R is the data rate, P$_t$ is the transmission power, and E( ) is an energy consumption.

3. The low-power transmission method of claim 1, wherein E(L*,R,P$_t$) is obtained by adding up $E_{MSDU,k(\ )}$ that is an energy consumed to transmit each MSDU in the assigned time slot.

4. The low-power transmission method of claim 3, wherein $E_{MSDU,k(\ )}$ is calculated from the equation:

$$E_{MSDU,k}(L, R, P_t) =$$

$$\left\{ \left[\frac{L_{MSDU}}{L}\right] E_{frame}(L, R, P_t) + E_{frame}(L_{remain}, R, P_t) \right\} \sum_{i=0}^{q} FER^i + \left[\frac{L_{MSDU}}{L}\right]$$

$$\{(E_{SIFS} + E_{ACK})(1 - FER) + E_{SIFS} \cdot FER\} \cdot \sum_{i=0}^{q} FER^i$$

where L is the length of the fragment, R is the data rate, P$_t$ is the transmission power, $L_{MSDU}$ is a size of the MSDU, $L_{remain}$ is a size of a remaining fragment after dividing $L_{MSDU}$ by L, $E_{frame}$ is an energy consumed to transmit one frame, $E_{SIFS}$ is an energy consumed to wait for an ACK frame of an ACK mode when frame transmission is successful, $E_{ACK}$ is an energy consumed to receive the ACK frame, FER is a frame error rate, and q is an upper limit value of the transmission retries.

5. The low-power transmission method of claim 1, further comprising:
    determining whether a frame to be transmitted is a start of a new MSDU when a channel environment changes during the frame transmission;
    selecting a new combination <L*,R',P$_t$'> with respect to a remaining time of the assigned time slot when the start of the new MSDU is determined; and
    fixing L* with respect to the remaining time of the assigned time slot and selecting the combination <L*, R',P$_t$'> to transmit the frame with a minimum energy consumption when the start of the new MSDU is not determined.

6. A low-power transmission method in wireless network, the method comprising:
  accessing a channel to transmit a media access control (MAC) service data unit (MSDU) according to a carrier sense multiple access with collision avoidance (CSMA/CA) scheme in a contention access period (CAP);
  selecting a combination <L*,R',$P_t'$> of a length L of a fragment, a data rate R, and a transmission power Pt to minimize an energy E(L*,R,$P_t$) consumed to transmit at least one MAC service data unit (MSDU) using the assigned time slot; and
  transmitting a frame to another apparatus over the network based on the selected <L*,R',$P_t'$>.

7. The low-power transmission method of claim 6, wherein the <L*,R',$P_t'$> is calculated from the equation:

$$<L^*, R', P_t'> = \arg \min_{<L,R,Pt>} E(L^*, R, P_t),$$

where L is the length of the fragment, R is the data rate, $P_t$ is the transmission power, and E( ) is an energy consumption.

8. The low-power transmission method of claim 6, wherein E(L*,R,$P_t$) is obtained by multiplying $E_{frame(\,)}$ being an energy consumed to transmit one frame by a quotient resulting from the division of the size of the MSDU by the length of the fragment, and by a remainder, respectively.

9. The low-power transmission method of claim 8, wherein $E_{frame(\,)}$ is calculated from the equation:

$$E_{frame}(L, R, P_t) = E[N_c](E_{BD} + E_{wait}) + E_{data}(L, R, P_t) + E_{ACK}$$

where $E[N_c]$ is a number of re-transmissions in consideration of a transmission error due to collision with the another apparatus and channel environment, $E_{BD}$ is an energy including an energy consumed to search a channel during a backoff delay and an energy consumed at the failure of the frame transmission, $E_{wait}$ is an energy consumed to await before retransmitting, $E_{data(\,)}$ is a transmission energy consumed at the successful frame transmission, and $E_{ACK}$ is an energy consumed to receive the ACK.

10. The low-power transmission method of claim 6, further comprising:
  fixing L* and selecting the combination, <L*,R',$P_t'$> to transmit the frame with a minimum energy consumption with respect to a time required to transmit a rest of the frame when the channel environment changes during the frame transmission.

11. The low-power transmission method of claim 10, wherein the time required to transmit the rest of the frame is calculated from the equation:

$$E[D] = E[N_c](E[BD] + T_c + T_0) + (E[BD] + T_S),$$

where E[BD] is the backoff delay in consideration of a delay time which is caused when the another transmission system occupies a channel and a size of a contention window (CW), $T_c$ is a time taken at the failure of the frame transmission, $T_0$ is a time required before searching a new channel, and $T_S$ is a transmission time at a successful frame transmission.

12. A low-power transmitting apparatus in a wireless network, comprising:
  a communication controller for communicating with a media access control (MAC) layer and transmitting a frame to another apparatus based on a length L of a fragment including at least one media access control (MAC) service data unit (MSDU), a data rate R, and a transmission power $P_t$ over a network that conforms to a carrier sense multiple access with collision avoidance (CSMA/CA) scheme in a contention period and conforms to a time division multiple access (TDMA) scheme in a contention-free period;
  a power regulator for selecting a combination among possible combinations of L, R, and $P_t$ to minimize a transmission energy consumption E(L*,R,$P_t$) of the communication controller and providing the selected combination to the communication controller; and
  a transmitter for transmitting the frame received from the communication controller to another apparatus.

13. The low-power transmitting apparatus of claim 12, wherein the power regulator calculates a combination <L*,R,$P_t'$> which minimizes the transmission energy consumption among the combinations of L, R, and $P_t$, from the equation:

$$<L^*, R', P_t'> = \arg \min_{<L,R,Pt>} E(L^*, R, P_t),$$

where L is the length of the fragment, R is the data rate, $P_t$ is the transmission power, and E( ) is an energy consumption.

14. The low-power transmitting apparatus of claim 12, wherein, when the power regulator transmits the MSDU in a contention period, E(L*,R,$P_t$) is obtained by multiplying $E_{frame(\,)}$, which is an energy consumed to transmit one frame, by a quotient resulting from the division of the size of the MSDU by the length of the fragment, and by a remainder, respectively.

15. The low-power transmitting apparatus of claim 14, wherein $E_{frame(\,)}$ is calculated from the equation:

$$E_{frame}(L, R, P_t) = E[N_c](E_{BD} + E_{wait}) + E_{data}(L, R, P_t) + E_{ACK}$$

where $E[N_c]$ is a number of re-transmissions in consideration of transmission error due to collision with the another apparatus and channel environment, $E_{BD}$ is an energy including an energy consumed to search a channel during a backoff delay and an energy consumed at the failure of the frame transmission, $E_{wait}$ is an energy consumed to await before retransmitting, $E_{data(\,)}$ is a transmission energy consumed at the successful frame transmission, and $E_{ACK}$ is an energy consumed to receive the ACK.

16. The low-power transmitting apparatus of claim 15, wherein the power regulator determines whether a frame to be transmitted is a start of a new MSDU when a channel environment changes during the frame transmission, selects a new combination <L*,R',$P_t'$> with respect to a remaining time of the assigned time slot when the start of the new MSDU is determined, and fixes L* with respect to the remaining time of the assigned time slot and selects the combination <L*,R',$P_t'$> to transmit the frame with a minimum energy consumption when the start of the new MSDU is not determined.

17. The low-power transmitting apparatus of claim 14, wherein the power regulator fixes L* and selects the combination <L*,R',$P_t'$> to transmit the frame with a minimum energy consumption with respect to a time required to transmit a rest of the frame when the channel environment changes during the frame transmission.

18. The low-power transmitting apparatus of claim 17, wherein the time required to transmit the rest of the frame is calculated from the equation:

$$E[D]=E[N_c](E[BD]+T_c+T_0)+(E[BD]+T_S)$$

where E[BD] is the backoff delay in consideration of a delay time which is caused when the another transmission system occupies a channel and a size of a contention window (CW), $T_c$ is a time taken at the failure of the frame transmission, $T_0$ is a time required before searching a new channel, and $T_S$ is a transmission time at a successful frame transmission.

19. The low-power transmitting apparatus of claim 12, wherein the communication controller transmits the frame using an assigned time slot when transmitting the MSDU in the contention-free period, and the power regulator defines $E(L^*,R,P_t)$ by adding up $E_{MSDU,k(\ )}$ that is an energy consumed to transmit each MSDU in the assigned time slot.

20. The low-power transmitting apparatus of claim 19, wherein $E_{MSDU,k(\ )}$ is calculated from the equation:

$$E_{MSDU,k}(L, R, P_t) =$$

$$\left\{\left[\frac{L_{MSDU}}{L}\right]E_{frame}(L, R, P_t) + E_{frame}(L_{remain}, R, P_t)\right\}\sum_{i=0}^{q} FER^i + \left[\frac{L_{MSDU}}{L}\right]$$

-continued $$\{(E_{SIFS} + E_{ACK})(1 - FER) + E_{SIFS} \cdot FER\} \cdot \sum_{i=0}^{q} FER^i$$

where L is the length of the fragment, R is the data rate, $P_t$ is the transmission power, $L_{MSDU}$ is a size of the MSDU, $L_{remain}$ is a size of a rest of the fragment after dividing $L_{MSDU}$ by L, $E_{frame(\ )}$ is an energy consumed to transmit one frame, $E_{SIFS}$ is an energy consumed to wait for an ACK frame of an ACK mode when the frame transmission is successful, $E_{ACK}$ is an energy consumed to receive the ACK frame, FER is a frame error rate, and q is an upper limit value of the transmission retries.

21. The low-power transmitting apparatus of claim 12, wherein the wireless network is a wireless personal area network (WPAN).

22. A transmission system which includes the transmitting apparatus of claim 12 and transceives data with a minimum energy consumption over a wireless personal area network (WPAN).

* * * * *